United States Patent [19]

Katoh et al.

[11] Patent Number: 5,060,744

[45] Date of Patent: Oct. 29, 1991

[54] DEVICE FOR CONTROLLING MOTOR-OPERATED THROTTLE VALVE FOR AUTOMOBILES

[75] Inventors: Yukiya Katoh; Sunao Kitamura; Hitoshi Takeuchi, all of Obu; Shinichiro Tanaka, Mishima, all of Japan

[73] Assignees: Aisan Kogyo Kabushiki Kaisha; Toyota Jidosha Kabushiki Kaisha, both of Japan

[21] Appl. No.: 569,968

[22] Filed: Aug. 20, 1990

[30] Foreign Application Priority Data

Aug. 28, 1989 [JP] Japan .................................. 1-221301

[51] Int. Cl.[5] ............................................ B60K 31/02

[52] U.S. Cl. .................................... 180/178; 123/361

[58] Field of Search ....................... 123/361, 399, 400; 180/178, 179; 364/426

[56] References Cited

U.S. PATENT DOCUMENTS

| | | | |
|---|---|---|---|
| 4,267,491 | 5/1981 | Collonia | 180/179 X |
| 4,729,356 | 3/1988 | Kaneko et al. | 123/361 |
| 4,785,782 | 11/1988 | Tanaka et al. | 123/399 |
| 4,873,957 | 10/1989 | Ueyama et al. | 123/399 |
| 4,892,071 | 1/1990 | Asayama | 123/400 X |
| 4,928,780 | 5/1990 | Tada | 180/179 |
| 4,960,091 | 10/1990 | Aufmkolk | 123/361 X |
| 4,969,437 | 11/1990 | Kolb | 123/399 |

FOREIGN PATENT DOCUMENTS

| | | |
|---|---|---|
| 59-153945 | 9/1984 | Japan . |
| 60-240835 | 11/1985 | Japan . |
| 63-140832 | 6/1988 | Japan . |
| 1-117947 | 5/1989 | Japan . |

*Primary Examiner*—Andres Kashnikow
*Assistant Examiner*—Michael Mar
*Attorney, Agent, or Firm*—Oliff & Berridge

[57] ABSTRACT

A motor-driven throttle valve control device for an automobile having an auto-drive function for keeping a running speed of the automobile constant, including a throttle shaft for opening and closing a throttle valve by a rotation thereof; a spring for rotating the throttle shaft in a direction to open the throttle valve; a limiter for limiting a maximum opening angle of the throttle shaft against a biasing force of the spring; a first operating device for rotating the limiter around the throttle shaft in response to an operational amount of depression of an accelerator device of the automobile; a second operating device for limiting an opening angle of the throttle shaft within a range between the maximum opening angle defined by the limiter and a full closed angle of the throttle valve; a motor for rotating the second operating device around the throttle shaft; a third operating device for opening the throttle shaft beyond the maximum opening angle defined by the limiter; and a connecting device for connecting the third operating device to the motor while the auto-drive function of the automobile is activated; whereby an opening angle of the throttle shaft is adjusted by the motor within the range equal to or less than the maximum rotating angle defined by the operational amount of the accelerator device while the auto-drive function is not activated, and an opening angle of the throttle shaft is adjusted by the motor irrespective of the operational amount of the accelerator device so as to keep the running speed of the automobile constant while the auto-drive function is activated.

24 Claims, 5 Drawing Sheets

DEVICE FOR CONTROLLING MOTOR-OPERATED THROTTLE VALVE FOR AUTOMOBILES

BACKGROUND OF THE INVENTION

The present invention relates to a throttle valve control device for an internal combustion engine of an automobile, and more particularly to a motor-driven throttle valve control device for the automobile having an auto-drive function to keep a running speed constant.

Conventionally, a motor-driven throttle valve control device for an internal combustion engine is disclosed in Japanese Patent Laid-open Publication No. 63-140832, for example. In this conventional device, an upper limit of an opening angle of a throttle valve adjustable by a motor is restricted by a mechanical device connected to an accelerator pedal to be operated by an operator. Since the opening angle of the throttle shaft may be suitably adjusted by the motor, the internal combustion engine may be controlled in accordance with the running condition of the automobile. Further, since the maximum opening angle is defined by the mechanical device, the uncontrollable situation of the engine may be avoided. However, this device cannot effect auto-drive control for keeping the running speed constant wherein the throttle valve is adjusted by an actuator without the operation of the accelerator pedal by the operator.

SUMMARY OF THE INVENTION

It is a first object of the present invention to provide a motor-driven throttle valve control device which may effect auto-drive control without the need of operation of the accelerator means while the auto-drive function is being activated.

It is a second object of the present invention to provide a motor-driven throttle valve control device which may optimally set a throttle valve opening characteristic under the condition that the auto-drive function is not activated according to the automobile characteristic.

It is a third object of the present invention to provide a motor-driven throttle valve control device which may cancel the auto-drive control upon abnormality of the motor to resume the normal drive control by the accelerator means.

According to the present invention, there is provided a motor-driven throttle valve control device for an automobile having an auto-drive function for keeping a running speed of said automobile constant, comprising a throttle shaft for opening and closing a throttle valve by a rotation thereof; biasing means for rotating said throttle shaft in a direction to open said throttle valve; limiting means for limiting a maximum opening angle of said throttle shaft against a biasing force of said biasing means; first operating means for rotating said limiting means around said throttle shaft in response to an operational amount of accelerator means of said automobile; second operating means for limiting an opening angle of said throttle shaft within a range between the maximum opening angle defined by said limiting means and a full closed angle of said throttle valve; a motor for rotating said second operating means around said throttle shaft; third operating means for opening said throttle shaft beyond the maximum opening angle defined by said limiting means; and connecting means for connecting said third operating means to said motor while the auto-drive function of said automobile is activated; whereby an opening angle of said throttle shaft is adjusted by said motor within the range equal to or less than the maximum rotating angle defined by the operational amount of said accelerator means while the auto-drive function is not activated, and an opening angle of said throttle shaft is adjusted by said motor irrespective of the operational amount of said accelerator means so as to keep the running speed of said automobile constant while the auto-drive function is activated.

With this construction, under the normal drive control while the auto-drive function is not activated, the third operating means is disconnected from the motor. Therefore, the third operating means is not activated. Under this condition, the throttle shaft is biased to rotate in a direction to open the throttle valve, and the rotating angle of the shaft is determined by the rotational angle of the second operating means adjusted by the motor within the range equal to or less than the angle defined by the limiting means. The angle of the limiting means is defined by the operational amount of the accelerator means. Therefore, while the auto-drive function is not activated, the opening angle of the throttle valve is adjusted by the motor within the range defined by the operational amount of the accelerator means.

On the other hand, while the auto-drive function is activated, the third operating means is connected to the motor. Therefore, not only the second operating means but also the third operating means is activated and rotated by the motor. Therefore, the rotating angle of the throttle shaft may be adjusted by the motor so as to keep the running speed of the automobile constant irrespective of the rotating angle of the limiting means or the operational amount of the accelerator means.

The invention will be more fully understood from the following detailed description and appended claims when taken with the drawings.

DETAILED DESCRIPTION OF THE PREFERRED EMBODIMENTS

There will now be described some preferred embodiments of the present invention with reference to the drawings.

Figure 1:
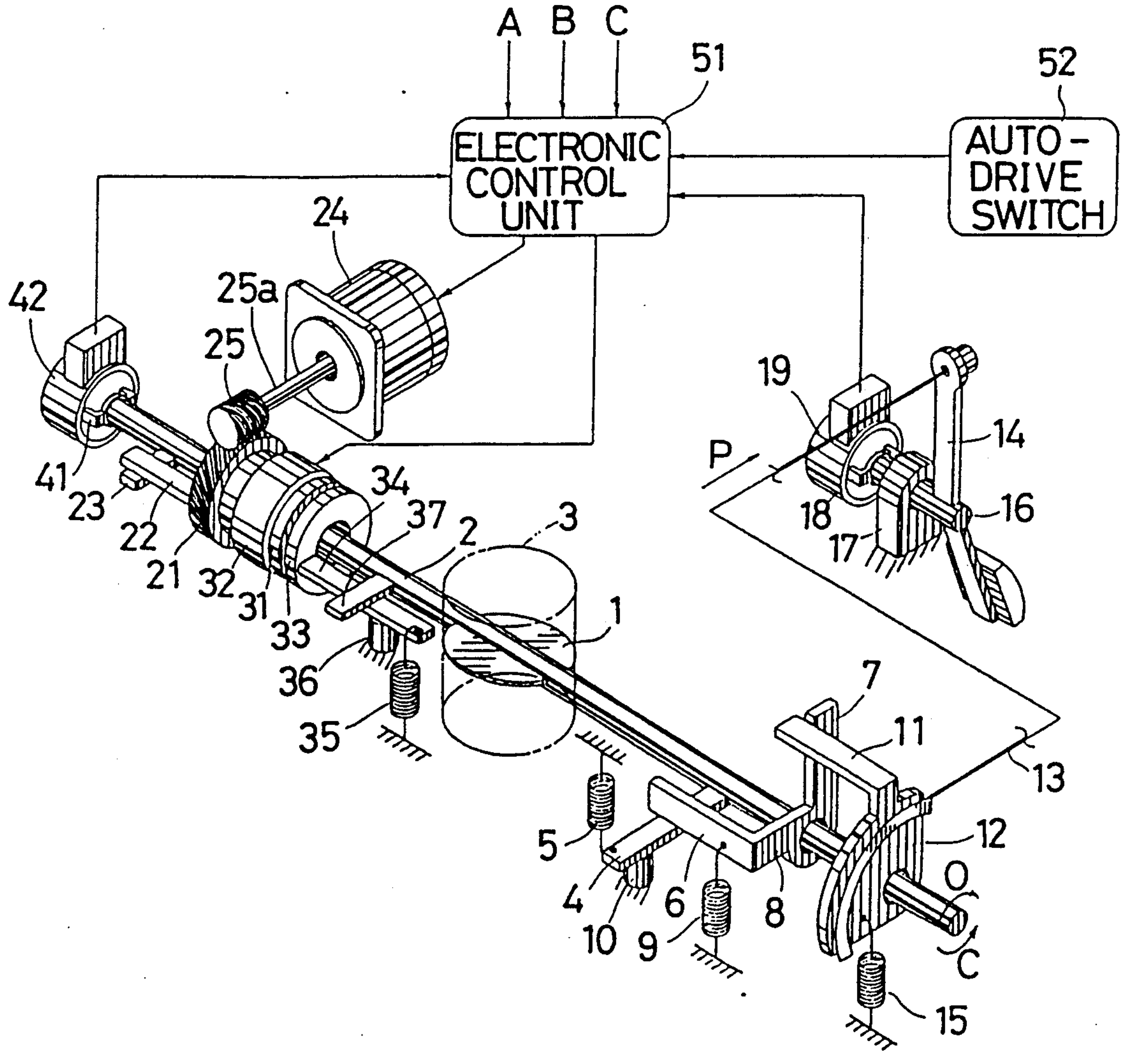
FIG. 1 is a schematic perspective view of a first preferred embodiment of the present invention.

Referring first to FIG. 1 which shows a first preferred embodiment of the present invention in perspective, a throttle valve 1 is fixed to a throttle shaft 2 rotatably supported to a throttle body (not shown). The throttle valve 1 is opened or closed by rotating the throttle shaft 2 in a direction of arrow O (valve opening direction) or in a direction of arrow C (valve closing direction), respectively, so that an opening area of an air intake passage 3 formed in the throttle body may be changed to control an air amount to be supplied to an internal combustion engine (not shown).

A projection 4 is fixed to the throttle shaft 2, and one end of a spring 5 is connected to the projection 4 so as to bias the throttle shaft 2 in the direction O. The other end of the spring 5 is connected to the throttle body. The spring 5 functions as the biasing means for rotating the throttle shaft 2 in the direction O to open the same according to the present invention. A lever 8 having projections 6 and 7 is rotatably mounted on the throttle shaft 2 so as to be rotated about the throttle shaft 2. One end of a spring 9 having a biasing force greater than that of the spring 5 is connected to the projection 6, and the other end of the spring 9 is connected to the throttle body. When the throttle shaft 2 is rotated in the direction O by the spring 5, and the projection 4 comes into contact with the projection 6, the throttle shaft 2 cannot be rotated any more since the spring force of the spring 9 is greater than that of the spring 5. Therefore, it is understood that the projection 6 and the spring 9 functions as the limiting means for limiting a maximum opening angle of the throttle shaft 2 against the biasing force by the spring 5. A stopper 10 is mounted on the throttle body for restricting the rotation of the projection 4 in the direction C. When the projection 4 abuts against the stopper 10, the valve 1 fully closes the intake passage 3. The biasing force of the spring 5 is set sufficient to overcome a resistance of a suction air flow in the air intake passage 3 and a load resistance of bearings (not shown) for supporting the throttle shaft 2, so as to open the throttle valve 1 while the projection 4 is not in contact with the projection 6. On the other hand, the biasing force of the spring 9 is set sufficient to overcome the biasing force of the spring 5 plus the resistance of the suction air flow in the air intake passage 3 and the load resistance of the bearings for supporting the throttle shaft 2, so as to close the throttle valve 1. When an accelerator pedal 14 is not depressed as shown in FIG. 1, the projection 6 abuts against the projection 4 to make it in contact with the stopper 10, so that the throttle valve 1 is maintained in a full closed position.

A lever 12 having a projection 11 is rotatably mounted on the throttle shaft 2 so as to be rotated about the throttle shaft 2. The lever 12 is connected through an accelerator wire 13 to the accelerator pedal 14, so that when the accelerator pedal 14 is depressed, the lever 12 is rotated in the direction O. One end of a spring 15 for biasing the lever 12 in the direction C is connected to the lever 12, and the other end of the spring 15 is connected to the throttle body. Accordingly, when the accelerator pedal 14 is depressed the lever 12 is rotated in the direction O against a biasing force of the spring 15. The projection 11 of the lever 12 is in contact with the projection 7 of the lever 8. Accordingly, when the lever 12 is rotated in the direction O against the biasing force of the spring 15, the projection 7 of the lever 8 contacting the projection 11 of the lever 12 is rotated by a torque of the lever 12 against the biasing force of the spring 9 to rotate the lever 8 in the direction O. Therefore, it is understood that the wire 13, lever 12, projection 11, projection 7 and lever 8 function as the first operating means for rotating the projection 6 around the throttle shaft 2 in response to the operational amount of the accelerator pedal 14.

The accelerator pedal 14 is fixed to a rotating shaft 16 which is rotatably supported to a bearing 17 fixed to a vehicle body (not shown). A lever 18 is mounted to an end of the rotating shaft 16 so as to rotate an acceleration amount sensor 19 such as a potentiometer for detecting an operational amount of the accelerator pedal 14.

A gear 21 is rotatably mounted on the throttle shaft 2 so as to be rotated about the throttle shaft 2. A projection 22 is fixed to an end surface of the gear 21, and a projection 23 is fixed to the throttle shaft 2. The projection 22 can be contacted with the projection 23 so as to restrict the rotation of the throttle shaft 2 in the direction O. An output gear 25 is mounted on an output shaft 25*a* of a motor 24, and is meshed with the gear 21, so that when the output shaft 25*a* of the motor 24 is rotated, the gear 21 is rotated around the throttle shaft 2. When the gear 21 is in an irrotational condition by the motor 24 and the stopping angle of the gear 21 is less than the rotating angle of the projection 6, the projection 23 is in contact with the projection 22, and the rotation of the throttle shaft 2 in the direction O is restricted. When the gear 21 is rotated further, and the rotating angle of the projection 22 is greater than that of the projection 6, the opening angle of the shaft 2 is limited by the projection 6. Thus, it is understood that the gear 21 and the projection 22 function as the second operating means for limiting the opening angle of the throttle shaft 2 within the range between the maximum opening angle defined by the projection 6 and a full closed angle defined by the stopper 10.

An electromagnetic clutch 32 having an input portion 31 and an output portion 33 is rotatably mounted on the throttle shaft 2 so as to be rotated about the throttle shaft 2. The input portion 31 is integrally connected with the gear 21. When the electromagnetic clutch 32 is excited, the output portion 33 is connected to the input portion 31, and when the gear 21 is rotated, the input gear 31 and the output gear 33 are rotated together about the throttle shaft 2. A projection 34 is fixed to an end surface of the output portion 33. One end of a spring 35 is connected to the projection 34, and the other end of the spring 35 is connected to the throttle body. When the electromagnetic clutch 32 is in an unexcited condition, the projection 34 is biased by the spring 35 to abut against a stopper 36 mounted on the throttle body, thereby maintaining the output portion 33 in an initial position as restricted by the stopper 36. Further, a projection 37 is fixed to the throttle shaft 2 so as to be contactable with the projection 34.

When the electromagnetic clutch 32 is excited, and the gear 21 is rotated in the direction O by the motor 24, the projection 34 of the output portion 33 rotates the projection 37 in the direction O, with the result that the throttle shaft 2 is rotated in the direction O. At this time, the motor 24 generates a torque required for rotating the throttle shaft 2 against the biasing forces of the spring 35 and the spring 9. Thus, the motor 24 can rotate both the shaft 2 and the lever 8 so that the projections 7 and 11 are separated from each other. Therefore, it is understood that the output portion 33 and the projection 34 function as the third operating means for opening the throttle shaft beyond the maximum opening angle defined by the operational amount of the pedal 14, and the electromagnetic clutch 32 functions as the connecting means for connecting the output portion 33 and the projection 34 to the motor 24.

A lever 41 is fixed to an end of the throttle shaft 2, and is engaged with a throttle valve opening sensor 42 such as a potentiometer for detecting an opening angle of the throttle valve 1 in association with the rotation of the throttle shaft 2.

The throttle valve control device according to the present invention further includes an electronic control unit (ECU) 51 and an auto-drive switch 52 to be turned on when the vehicle is intended to be driven at a constant speed without depressing the accelerator pedal 14. The ECU 51 is electrically connected to the acceleration amount sensor 19, the throttle opening sensor 42 and the auto-drive switch 52 for inputting signals from the sensors 19 and 42 and the switch 52. The ECU 51 further inputs detection signals A, B and C indicative of operational conditions of the vehicle and the internal combustion engine such as an engine speed, vehicle speed and wheel slip condition.

The ECU 51 is also electrically connected to the motor 24 and the electromagnetic clutch 32 for outputting control signals thereto.

The operation of the throttle valve control device as constructed above will now be described.

First, the operation under normal drive control of the vehicle will be described wherein the vehicle is driven by depressing the accelerator pedal 14 under the condition where the auto-drive switch 52 is maintained off.

When the auto-drive switch 52 is in an off-state, the ECU 51 maintains an inoperative or unexcited condition of the electromagnetic clutch 32 to separate the output portion 33 from the input portion 31. Accordingly, the projection 34 of the output portion 33 is maintained in abutment against the stopper 36 by the spring 35 as shown in FIG. 1. In the condition shown in FIG. 1 where the accelerator pedal 14 is not depressed to maintain the throttle valve 1 in a full closed position, the throttle valve 1 is maintained at a full closed position even if the motor 24 is erroneously rotated in the direction O.

Under the above condition, when the accelerator pedal 14 is depressed, the accelerator wire 13 is drawn in a direction of arrow P to rotate the lever 12 in the direction O against the biasing force of the spring 15. As a result, the projection 11 of the lever 12 operates to rotate the projection 7 of the lever 8 in the direction O against the biasing force of the spring 9, thereby rotating the lever 8 in the direction O. However, since the projection 23 of the throttle shaft 2 is stopped in rotation by the projection 22 of the gear 21, the throttle shaft 2 is not rotated in the direction O, that is, the throttle valve 1 is not opened in spite of the fact that the projection 6 of the lever 8 is rotated in the direction O.

Then, when the ECU 51 generates a rotation signal to the motor 24 to rotate the same at a limited angle corresponding to an operational amount of the accelerator pedal 14, the output gear 25 operates to rotate the gear 21 in the direction O. Accordingly, the projection 22 of the gear 21 is rotated in the direction O. Since the throttle shaft 2 is biased to rotate in the direction O by a spring 5, the projection 23 follows the rotation of the projection 22 by the motor 24. As a result, the projection 4 of the throttle shaft 2 is rotated in the direction O by the biasing force of the spring 5 until it comes into contact with the projection 6 of the lever 8. Thus, the throttle shaft 2 is rotated in the direction O to open the throttle valve 1 within a limited angular range corresponding to the operational amount of the accelerator pedal 14.

Figure 2:
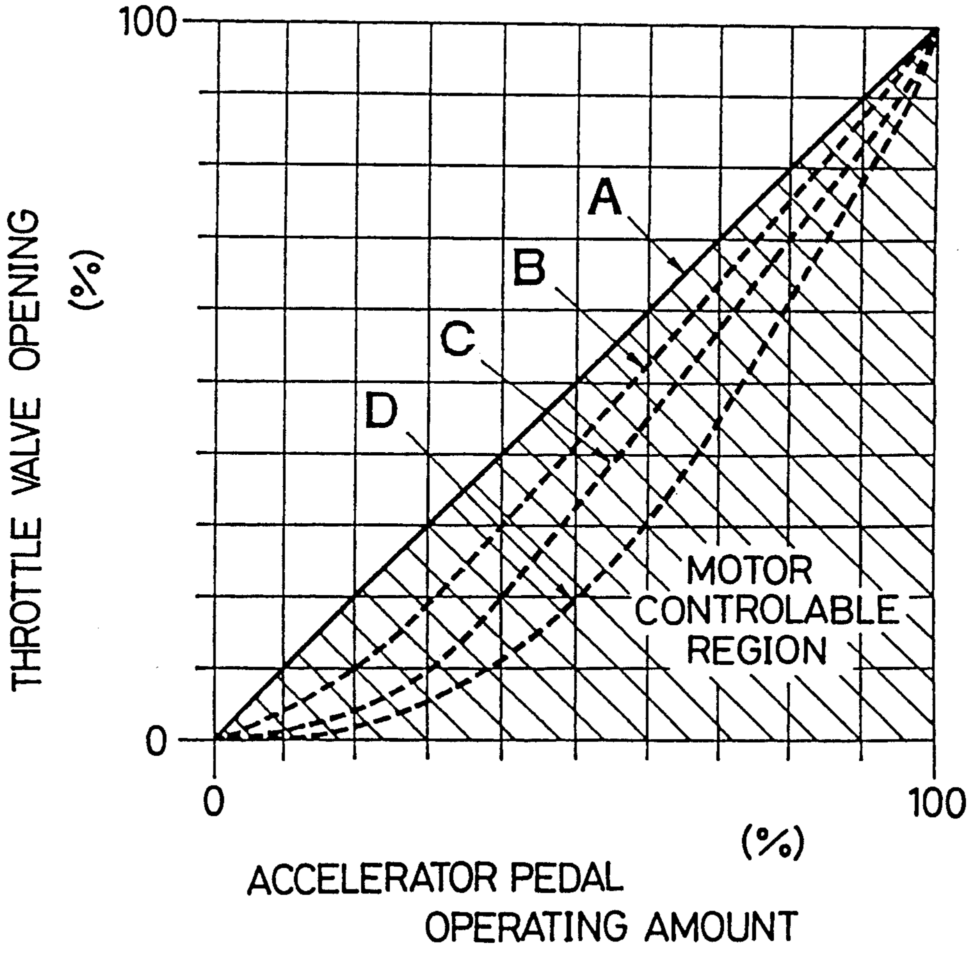
FIG. 2 is a graph showing a throttle valve opening characteristic, that is, the relation between the throttle valve opening angle and the operational amount of the accelerator pedal according to the first preferred embodiment.

FIG. 2 shows a characteristic of an opening angle of the throttle valve 1 with respect to a depression angle or an operating amount of the accelerator pedal 14.

According to a characteristic A shown in FIG. 2, the opening angle of the throttle valve 1 is varied linearly with the operational amount of the accelerator pedal 14. Accordingly, the opening angle of the throttle valve 1 is controlled in proportion to the operational amount of the accelerator pedal 14.

According to characteristics B, C and D shown in FIG. 2, the opening angle of the throttle valve 1 is controlled according to respective maps preliminarily stored in a memory in the ECU 51 in accordance with vehicle characteristics or automobile character. These characteristics B, C and D may be desirably modified in a motor control region (hatched area) by changing the content of the map. Furthermore, the above characteristics may be selected according to a running condition of the vehicle. For example, in the event that the accelerator pedal 14 is excessively depressed to cause excess output of the engine and cause wheel slip, the throttle valve 1 may be closed to a proper angle irrespective of the operating amount of the accelerator pedal 14. Thus, proper start and acceleration of the vehicle may be realized.

As to the safety of the operation, even when the motor 24 and/or the ECU 51 fail to operate, and the gear 21 is accordingly fixed at a certain rotational angle, the throttle valve 1 may be fully closed by returning the accelerator pedal 14. Thereafter, the throttle valve 1 may be operated within an angular range up to the fixed rotational angle of the gear 21 according to the characteristic A shown in FIG. 2.

Further, even when an output torque of the motor 24 becomes zero because of breaking of inner or outer leads of the motor 24, the throttle valve 1 may be operated according to the characteristic A shown in FIG. 2 by the biasing force of the spring 5 by operating the accelerator pedal 14, thus ensuring safety running of the vehicle.

Next, the operation under auto-drive control of the vehicle to be effected by turning on the auto-drive switch 52 will be described.

When the auto-drive switch 52 is turned on to apply an output signal to the ECU 51, the ECU 51 starts the auto-drive control, provided that an auto-drive condition of the vehicle according to the detection signals A, B and C is established. At starting of the auto-drive control, the electromagnetic clutch 32 is excited by an output signal from the ECU 51, so that the output portion 33 is electromagnetically connected to the input portion 31 to allow rotation together. Under the condition, when the motor 24 is driven irrespective of the depression of the accelerator pedal 14, the gear 21 is rotated in the direction O by the output gear 25 to thereby integrally rotate the output portion 33 with the input portion 31 in the direction O. As a result, the projection 34 of the output portion 33 is rotated in the direction O against the biasing force of the spring 35. Thus, the throttle shaft 2 is rotated in the direction O to open the throttle valve 1. At this time, the projection 4 of the throttle shaft 2 urges to rotate the projection 6 of the lever 8 in the direction O against the biasing force of the spring 9. Accordingly, the projection 7 of the lever 8 is brought into separation from the projection 11 of the lever 12. That is, the lever 12 is not rotated with the lever 8 but slacking of the accelerator wire 13 is prevented. In this manner, the auto-drive control may be effected without depression of the accelerator pedal 14.

Under the auto-drive control, when the electromagnetic clutch 32 is disengaged by cutting off the signal from the ECU 51, the output portion 33 separated from the input portion 31 is rotated in the direction C by the biasing force of the spring 35 to be returned to the original position. Accordingly, in the case of abnormality of the motor 24, the auto-drive control is cancelled to restore a normal drive control by cutting off the signal from the ECU 51 to the electromagnetic clutch 32. Thereafter, as mentioned above, the throttle valve 1 is controlled according to the characteristic A shown in FIG. 2 by operating the accelerator pedal 14. Further, in the case of abnormality of the electromagnetic clutch 32, the throttle valve 1 may be fully closed by reversely rotating the motor 24, thus ensuring the safety.

Figure 3:
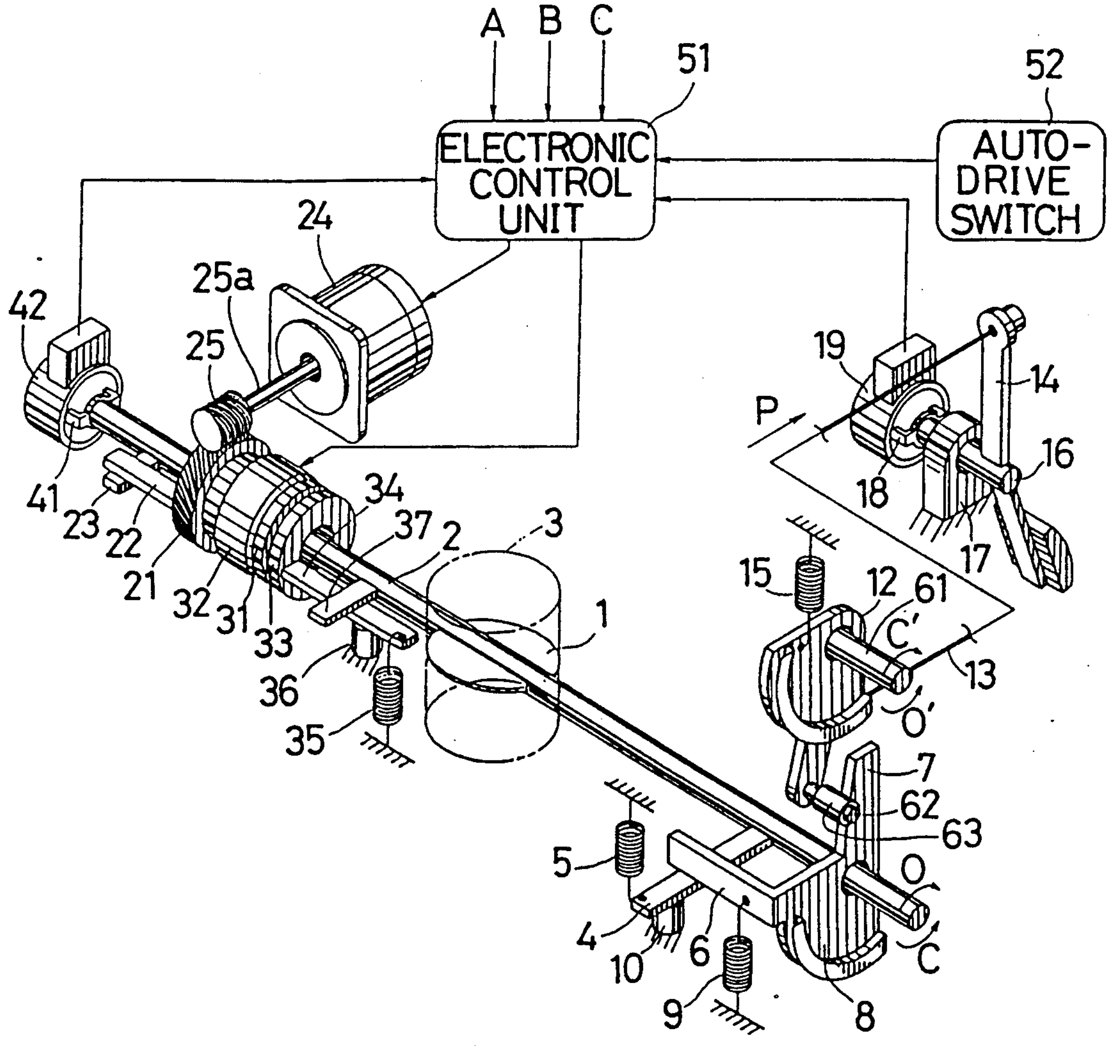
FIG. 3 is a schematic perspective view of a second preferred embodiment of the present invention.

Referring next to FIG. 3 which shows a second preferred embodiment of the present invention, the first operating means in the first preferred embodiment is modified with the other constructions be the same as those of the first preferred embodiment as designated by the same reference numerals.

Figure 4:
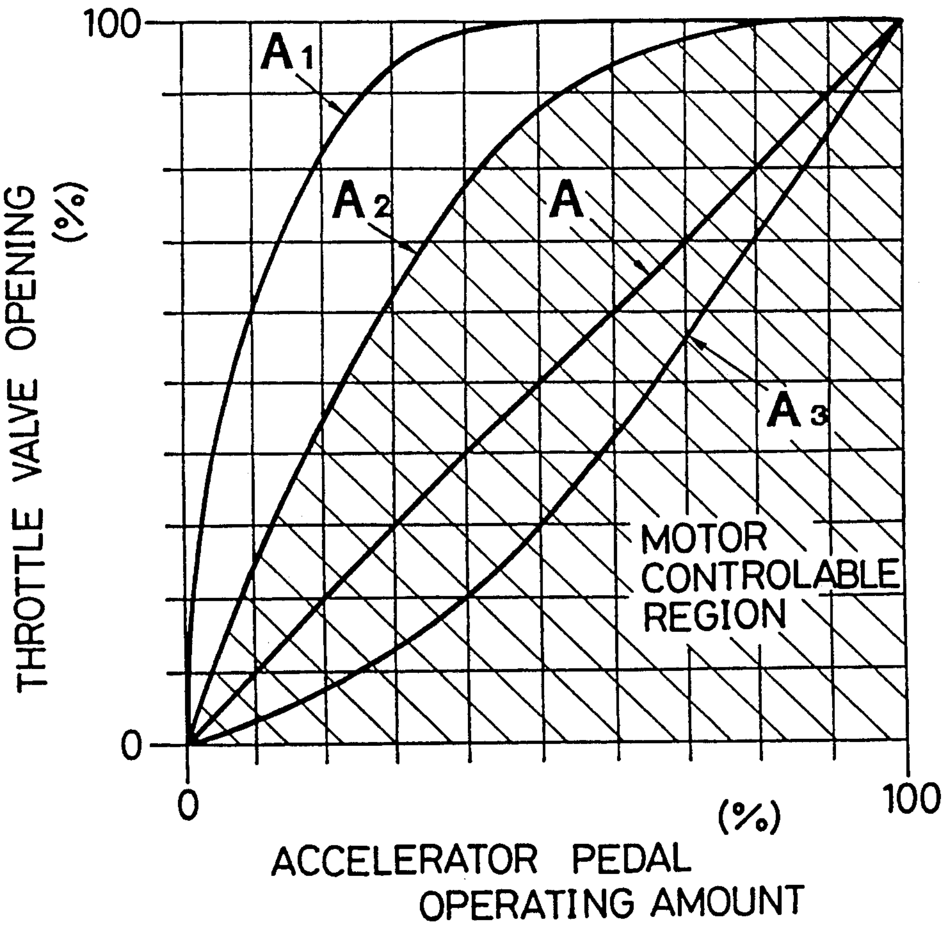
FIG. 4 is a graph showing a throttle valve opening characteristic, that is, the relation between the throttle valve opening angle and the accelerator pedal according to the second preferred embodiment.

The lever 12 is rotatably mounted on a shaft 61 offset from the throttle shaft 2 so as to be rotated about the shaft 61. The lever 12 is formed with a pin 62 for rotatably supporting a roller 63, so that when the lever 12 is rotated in a direction of arrow O′, the roller 63 urges the projection 7 of the lever 8 to rotate the lever 8 in the direction O. With this construction, the relationship between the operational amount of the accelerator pedal 14 and the opening angle of the throttle valve 1 adjustable by the motor 24 may be changed. That is, by changing the shape of the projection 7 of the lever 8, the characteristic A shown in FIG. 2 may be changed to a characteristic A1, A2 or A3 as shown in FIG. 4. In setting the characteristic A1 or A2, a throttle valve opening characteristic may be varied more widely than that in the first preferred embodiment, thereby effecting optimum opening characteristic according to the automobile character. The hatched area in FIG. 4 shows an area controllable by the motor 24 when the shape of the projection 7 corresponds to the characteristic A2, for example.

Figure 5:
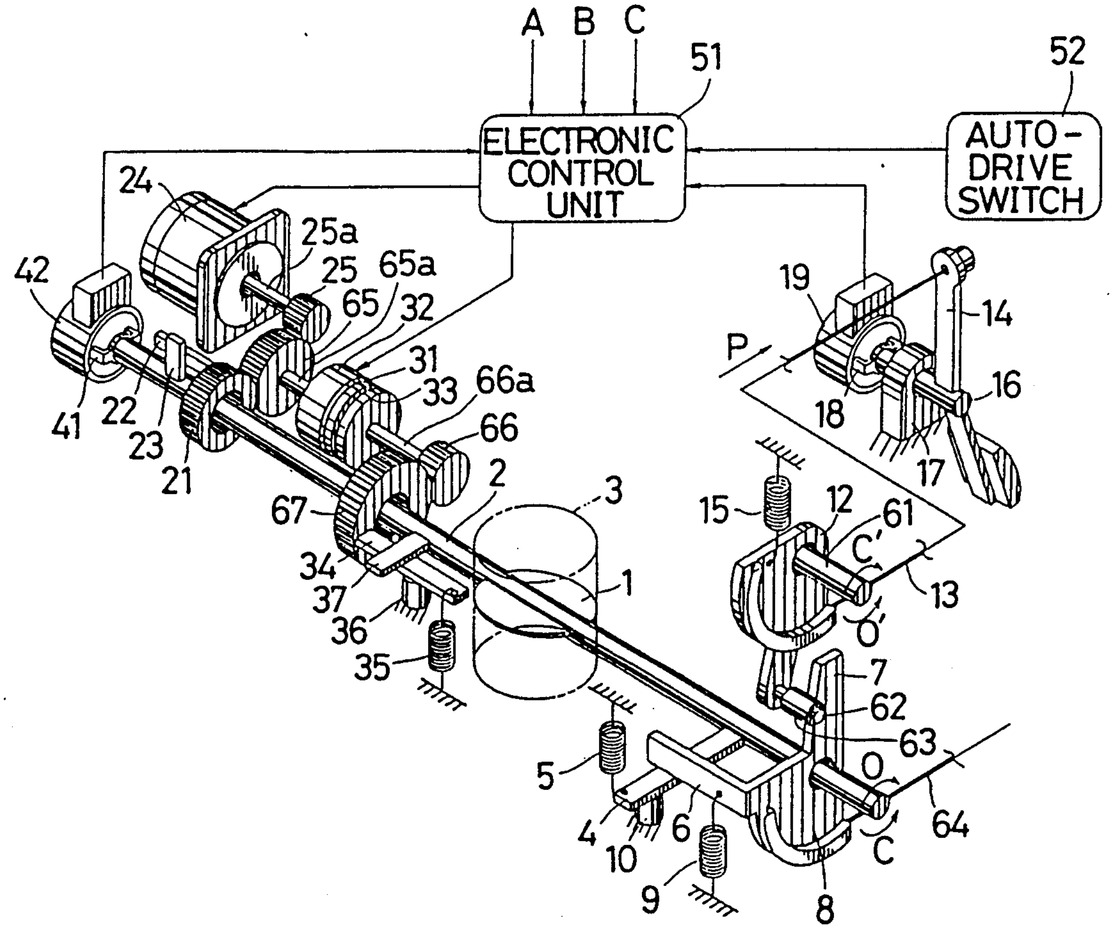
FIG. 5 is a schematic perspective view of a third preferred embodiment of the present invention.

Referring next to FIG. 5 which shows a third preferred embodiment of the present invention, the second and third operating means in the second preferred embodiment are modified with the other construction be basically the same as those of the second preferred embodiment as designated by the same reference numerals.

The third preferred embodiment is applied to a vehicle having an automatic transmission wherein a hydraulic pressure in the transmission is controlled in association with the operation of the throttle valve 1. A hydraulic pressure control wire 64 is connected to the lever 8, and it is controlled by rotating the lever 8 to draw the wire 64. That is, under the normal drive control, the wire 64 is drawn by operating the accelerator pedal 14, while under the auto-drive control, the wire 64 is drawn by the operation of the motor 24. Accordingly, the output torque of the motor 24 to be transmitted to the throttle shaft 2 is necessarily set to be large enough to draw the wire 64.

A gear 65 is fixedly mounted on a shaft **65*a* connected to the input portion 33 of the electromagnetic clutch 32, while a gear 66 is fixedly mounted on a shaft 66*a* connected to the output portion 33. The gear 65 meshes the output gear 25 of the motor 24, so that when the motor 24 is driven, the gear 65 is rotated. The gear 65 also meshes the gear 21 to rotate the same. On the other hand, the gear 66 meshes a gear 65 rotatably mounted on the throttle shaft 2 so as to be rotated about the throttle shaft 2, so that when the electromagnetic clutch 32 is excited, the gear 67 is rotated by the motor 24 through the gears 65 and 66. The projection 34 fixed on an end surface of the gear 67 and the projection 37 of the throttle shaft 2** have the same function as that mentioned in the first preferred embodiment.

With this construction, under the normal drive control, the throttle valve 1 may be operated at high speeds under the control by the motor 24 by suitably setting a gear ratio between the gears 65 and 21 and a gear ratio between the gears 66 and 67, while under the auto-drive control, the output torque of the motor 24 to be transmitted to the throttle shaft 2 may be set sufficient to draw the hydraulic pressure control wire 64 by suitably setting a gear ratio between the gears 66 and 67. Further, an operational ratio between the motor 24 and the throttle shaft 2 may be suitably selected between the normal drive control and the auto-drive control.

In the above preferred embodiments, the electromagnetic clutch 32 may be replaced by any other connecting means having a hydraulic or pneumatic (e.g., vacuum type) actuator.

Having thus described the preferred embodiments of the invention, it should be understood that numerous structural modifications and adaptations may be made without departing from the spirit of the invention.

What is claimed is:

1. A throttle valve control device for an internal combustion engine mounted on a vehicle having an auto-drive function, comprising:

elastic means (5) for applying a biasing force to a throttle shaft (2) which supports a throttle valve (1) so as to rotate said throttle valve in an opening direction thereof;

first operating means (4, 8, 9, 12, 15; 63) connected to accelerator means (13, 14) and restricting said throttle valve to a maximum opening angle against said biasing force of said elastic means according to an operational amount of depression of said accelerator means;

second operating means (21, 22, 23, 24, 25; 65) for rotating said throttle valve in said opening direction by utilizing said biasing force of said elastic means within a range of a restricted opening angle of said throttle valve to be defined by said first operating means when said operational amount of depression of said accelerator means is increased, and for rotating said throttle valve in a closing direction thereof against said biasing force of said elastic means when said operational amount of depression of said accelerator means is decreased;

third operating means (33, 34, 35, 37; 66, 67) to be interlocked with said second operating means when said third operating means is connected to said second operating means and for rotating said throttle valve irrespective of said restricted opening angle of said throttle valve to be effected by said first operating means;

connecting means (32) for connecting said second operating means to said third operating means;

an auto-drive switch (52) to be turned on when said vehicle is intended to run under an auto-drive condition; and control means (51) for operating said second operating means to control rotation of said throttle valve within the range of said restricted opening angle of said throttle valve to be effected by said first operating means when said auto-drive switch is in an off-state, while when said auto-drive switch is turned on, said control means supplying current to said connecting means so as to connect said second operating means through said connecting means to said third operating means and thereby operate said third operating means in interlocking relationship with said second operating means, whereby the rotation of said throttle valve is controlled according to operational conditions of said internal combustion engine and said vehicle while under the auto-drive condition.

2. The throttle valve control device as defined in claim 1, wherein said elastic means comprises a first spring (5) having one end connected to said first operating means and the other end connected to a throttle body.

3. The throttle valve control device as defined in claim 2, wherein said first operating means comprises:

a first projection (4) fixed to said throttle shaft;

a first lever (8) rotatably mounted on said throttle shaft so as to be rotatable about said throttle shaft and contactable with said first projection;

a second spring (9) having one end connected to said first lever and the other end connected to said throttle body for contacting said first lever with said first projection and rotating said first projection in said closing direction of said throttle valve against said biasing force of said first spring;

a second lever (12) rotatably mounted on said throttle shaft so as to be rotatable about said throttle shaft and connected to said accelerator means so as to contact said first lever; and a third spring (15) having one end connected to said second lever and the other end connected to said throttle body for biasing said second lever in such a direction as to return said accelerator means to an original condition thereof.

4. The throttle valve control device as defined in claim 3, wherein said second operating means comprises:

a motor (24);

a first gear (25) mounted on an output shaft (25*a*) of said motor;

a second gear (21) rotatably mounted on said throttle shaft so as to be rotatable about said throttle shaft and meshing said first gear; and a third projection (23) fixed to said throttle shaft and contactable with said second projection.

5. The throttle valve control device as defined in claim 4, wherein said third operating means comprises:

an output member (33) rotatably mounted on said throttle shaft so as to be rotatable about said throttle shaft and connectable with said connecting means;

a fourth projection (34) provided on an end surface of said output member;

a fifth projection (37) fixed to said throttle shaft and contactable with said fourth projection; and a fourth spring (35) having one end connected to said fourth projection and the other end connected to said throttle body.

6. The throttle valve control device as defined in claim 5, wherein said connecting means comprises an electromagnetic clutch (32) to be excited by the current from said control means for connecting said second gear to said output member.

7. The throttle valve control device as defined in claim 2, wherein said first operating means comprises:

a first projection (4) fixed to said throttle shaft;

a first lever (8) rotatably mounted on said throttle shaft so as to be rotatable about said throttle shaft and contactable with said first projection;

a second spring (9) having one end connected to said first lever and the other end connected to said throttle body for contacting said first lever with said first projection and rotating said first projection in said closing direction of said throttle valve against said biasing force of said first spring;

a second lever (12) rotatably mounted on a shaft (61) offset from said throttle shaft and connected to said accelerator means;

a roller (63) rotatably supported to said second lever and contacting said first lever; and a third spring (15) havine one end connected to said second lever and the other end connected to said throttle body for biasing said second lever in such a direction as to return said accelerator means to an original condition thereof.

8. The throttle valve control device as defined in claim 7, wherein said second operating means comprises:

a motor (24);

a first gear (25) mounted on an output shaft (25*a*) of said motor;

a second gear (21) rotatably mounted on said throttle shaft so as to be rotatable about said throttle shaft and meshing said first gear; and a third projection (23) fixed to said throttle shaft and contactable with said second projection.

9. The throttle valve control device as defined in claim 8, wherein said third operating means comprises:

an output member (33) rotatably mounted on said throttle shaft so as to be rotatable about said throttle shaft and connectable with said connecting means;

a fourth projection (34) provided on an end surface of said output member;

a fifth projection (37) fixed to said throttle shaft and contactable with said fourth projection; and a fourth spring (35) having one end connected to said fourth projection and the other end connected to said throttle body.

10. The throttle valve control device as defined in claim 9, wherein said connecting means comprises an electromagnetic clutch (32) to be excited by the current from said control means for connecting said second gear to said output member.

11. The throttle valve control device as defined in claim 7, wherein said second operating means comprises:

a motor (24);

a first gear (25) mounted on an output shaft (25*a*) of said motor;

a second gear (65) fixed on a first rotating shaft (65*a*) offset from said throttle shaft and meshing said first gear;

a third gear (21) rotatably mounted on said throttle shaft so as to be rotatable about said throttle shaft and meshing said second gear;

a second projection (22) provided on an end surface of said third gear; and a third projection (23) fixed to said throttle shaft and contactable with said second projection.

12. The throttle valve control device as defined in claim 11, wherein said third operating means comprises:

an output member (33) fixed on a second rotating shaft (66*a*) coaxial with said first rotating shaft and connectable with said connecting means;

a fourth gear (66) fixed on said second rotating shaft and rotatable integrally with said output member;

a fifth gear (67) rotatably mounted on said throttle shaft so as to be rotatable about said throttle shaft and meshing said fourth gear;

a fourth projection (34) provided on an end surface of said fifth gear;

a fifth projection (37) fixed to said throttle shaft and contactable with said fourth projection; and a fourth spring (35) having one end connected to said fourth projection and the other end connected to said throttle body.

13. The throttle valve control device as defined in claim 12, wherein said connecting means comprises an electromagnetic clutch (32) to be excited by the current from said control means for connecting said second gear to said output member.

14. A device for controlling a motor-operated throttle valve for an automobile having an auto-drive function which may be activated for keeping a running speed of said automobile constant, comprising:

(a) a throttle shaft (2) adapted to be rotated for opening and closing said throttle valve (1);

(b) first means (5) for biasing said throttle shaft so as to rotate said throttle shaft in a direction such that said throttle valve is opened;

(c) second means (6, 9) for limiting of said throttle valve to a maximum opening angle against a biasing force of said first means;

(d) third means (13, 12, 11, 7, 8) for rotating said second means around said throttle shaft in response to an operational amount of depression of accelerator means (14) of said automobile;

(e) fourth means (21, 22) for limiting an opening angle of said throttle valve within a range between the maximum opening angle defined by said second means and a full closed angle of said throttle valve;

(f) a motor (24) for rotating said fourth means around said throttle shaft;

(g) fifth means (33, 34) for opening said throttle valve beyond the maximum opening angle defined by said second means; and (h) sixth means (32) for connecting said fifth means to said motor when the auto-drive function of said automobile is activated;

whereby when the auto-drive function is not activated, the opening angle of said throttle valve is adjusted by said motor within the range between the maximum opening angle and the full closed angle in response to the operational amount of depression of said accelerator means, and even when said motor fails to operate when the auto-drive function, has not been activated said throttle valve is operated within an angular range up to a fixed rotational angle as determined said fourth means, while when the auto-drive function is activated, the opening angle of said throttle valve is adjusted by said motor irrespective of the operational amount of depression of said accelerator means so as to keep the running speed of said automobile constant.

15. The device as defined in claim 14, wherein said first means comprises a spring (5) having one end connected to said throttle shaft through a projection (4) and the other end connected to a throttle body.

16. The device as defined in claim 15, wherein said second means comprises a projection (6) rotatable about said throttle shaft (2) and biased by a spring (9).

17. The device as defined in claim 15, wherein said third means comprises an accelerator wire (13) connected to an accelerator pedal (14), a lever (12) connected to said wire (13) and rotatable about an axis in response to the operation of the pedal, and a projection (11 or 62, 63) fixed on said lever (12) and rotating said projection (6).

18. The device as defined in claim 17, wherein said fourth means comprises a gear (21) rotatably mounted on said throttle shaft, and a projection (22) fixed to said gear (21).

19. The device as defined in claim 18, wherein said fifth means comprises an output member (33) rotatably mounted on said throttle shaft so as to be rotatable about said throttle shaft, and a projection (34) provided on an end surface of said output member.

20. The device as defined in claim 19, wherein said sixth means comprises an electromagnetic clutch (32) to be excited when the auto-drive function of the automobile is activated for connecting said motor to said output member.

21. The device as defined in claim 18, wherein said lever (12) is rotatable about a shaft (61) offset from said throttle shaft, and a roller (63) is rotatably mounted at an end of said lever (12), and wherein a lever (8) is rotatably mounted on said throttle shaft, said lever (8) having said projection (6) and said projection (7) contactable with said roller (63) so that the relation between the opening angle of the throttle shaft and the operational amount of the accelerator pedal may be variable.

22. The device as defined in claim 20, wherein said fourth means comprises a first gear (25) mounted on an output shaft (25*a*) of said motor, a second gear (21) rotatably mounted on said throttle shaft so as to be rotatable about said throttle shaft and meshing said first gear, and a projection (22) abutable against a projection (23) fixed to said throttle shaft.

23. The device as defined in claim 20, wherein said fourth means comprises a first gear (25) mounted on an output shaft (25*a*) of said motor, a second gear (65) fixed on a first rotating shaft (65*a*) offset from said throttle shaft and meshing said first gear, a third gear (21) rotatably mounted on said throttle shaft so as to be rotatable about said throttle shaft and meshing said second gear, and a projection (22) abutable against a projection (23) fixed to said throttle shaft.

24. The device as defined in claim 23, wherein said fifth means comprises an output member (33) fixed on a second rotating shaft (66*a*) coaxial with said first rotating shaft (65*a*) and connectable with said sixth means, a fourth gear (66) fixed on said second rotating shaft and rotatable integrally with said output member, a fifth gear (67) rotatably mounted on said throttle shaft so as to be rotatable about said throttle shaft and meshing said fourth gear, and a projection (34) provided on an end surface of said fifth gear.

* * * * *